United States Patent Office 3,317,594
Patented May 2, 1967

3,317,594
HALOFORMYLALKANESULFENYL HALIDES
AND THEIR PREPARATION
Norman Kharasch and Robert B. Langford, Los Angeles,
Calif., assignors to Stauffer Chemical Company, New
York, N.Y., a corporation of Delaware
No Drawing. Filed Nov. 13, 1963, Ser. No. 323,227
3 Claims. (Cl. 260—544)

This invention relates to new and novel organic compounds containing both sulfenyl halide and acyl halide groups, and the method of preparing them.

More particularly, this invention relates to the new and novel bifunctional sulfur containing compounds, haloformylalkanesulfenyl halides, and the method of preparing them.

The novel compounds of this invention are produced by the halogenation of a thiolactone as represented by the following equation:

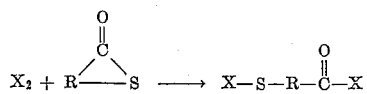

wherein X is a halogenating agent selected from the group consisting of chlorine, bromine, sulfuryl chloride, and the like, and R is a bivalent radical selected from the group consisting of dimethylene, trimethylene, substituted dimethylene and substituted trimethylene. Examples of suitable starting materials are β-thiopropiolactone and γ-thiobutyrolactone.

The halogenation agents which are operable in the above reaction are to include halogenoids and other interhalogen compounds, as well as halogens and halogenating agents as sulfuryl chloride.

The proportion of thiolactone to halogenating agent is not narrowly critical. The preferred range is 1 to 2 parts by weight of available halogen from the halogenating agent to 1 part of thiolactone.

The temperature at which the reaction is carried out is not critical and temperatures within the range of about −30° C. and lower to 150° C. and higher are operable. The reaction is also conducted under substantially anhydrous conditions.

The novel compounds of this invention are useful as intermediates for the synthesis of other compounds, since these compounds have two reactive functional groups, a sulfenyl halide group and an acyl halide group, which are both capable of reaction with a wide variety of other reagents. As a result of the different degree of reactivity of these two functional groups, it is possible to cause selective reactivity with other chemicals. These compounds are also useful in the vulcanization of rubber and the manufacture of rubber products, and the treatment of textiles to impart wash and wear characteristics.

The following examples illustrate the present invention.

Example 1

To a solution of 20.4 g. (0.2 mole) of γ-thiobutyrolactone in 100 ml. of dry carbon tetrachloride kept at −20° to −30° C. was added portionwise, with good stirring, 14 g. (0.2 mole) of chlorine in dry carbon tetrachloride, at the same temperature. The addition rate was regulated to prevent the exothermic reaction from causing the temperature from rising above −20° C. A transient white precipitate, possibly the alkyl sulfur trichloride, formed with each addition of chlorine but dissolved within several seconds into the stirred reaction mixture. An orange solution formed, becoming more colored as chlorine addition progressed. After chlorine addition was complete the reaction mixture was removed from the cooling bath and allowed to stand for a few minutes. The solvent was then removed under aspirator vacuum on a 40° C. water bath. A viscous orange liquid remained; crude yield 35 g.

The crude material was immediately distilled under reduced pressure. Boiling point 64–69° (1 mm.). Yield 23.5 g. or 67.0%. This was redistilled, B.P. 66–68° at 1 mm. Yield 14.5 g. or 61.0% of the first distillate. The product was 3-chloroformylpropanesulfenyl chloride.

The product was an orange colored oily liquid which fumed in air and had a sharp odor. Due to the tendency to decompose at room temperature with the loss of hydrogen chloride gas, in order to obtain a satisfactory elemental analysis a freshly prepared and twice distilled sample was stored in dry ice and analyzed within 16 hours.

Analysis.—Calculated for $C_4H_6Cl_2OS$; C, 27.76; H, 3.49; Cl, 40.98. Found: C, 28.39; H, 3.49; Cl, 40.06.

The infrared spectrum had a strong peak at 1790 cm.$^{-1}$ typical of acyl chlorides. Refractive index at 20° C. 1.6174.

Example 2

The procedure carried out in Example 1 was repeated, except that 28 g. (0.21 mole) of sulfuryl chloride was substituted for the 14 g. of chlorine. In every other respect the procedure was unchanged. Crude yield, after removal of the solvent, was 34.6 g. Comparison by infrared spectroscopy of the products of Example 1 and this example showed the products to be identical, 3-chloroformylpropanesulfenyl chloride.

Example 3

As an example of the utility of the compounds of this invention to react with other reagents, the addition to cyclohexene was carried out. This utilizes only the sulfenyl halide group, leaving the acyl chloride group free for further reactions.

To a solution of 6 g. of freshly prepared 3-chloroformylpropanesulfenyl chloride in 25 ml. of dry carbon tetrachloride at −10° C. was added a solution of 3 g. of cyclohexene in 25 ml. dry carbon tetrachloride. This was added portionwise, with stirring, at a rate which did not allow the exothermic reaction to raise the temperature above 0° C. Almost all of the orange color of the sulfenyl chloride had disappeared within one minute after addition of the cyclohexene was complete. Removal of the solvent under reduced pressure left a yellow colored liquid. The product was distilled under reduced pressure, B.P. 128–129° C./1 mm. The product was 2-chlorocyclohexyl-3′-chloroformylpropyl sulfide.

Analysis.—Calculated for $C_{10}H_{16}Cl_2OS$: C, 45.63; H, The infrared spectrum showed a sharp peak at 1790 6.38; Cl, 27.39. Found: C, 47.24; H, 6.71; Cl, 27.92.

The infrared spectrum showed a sharp peak at 1790 cm.$^{-1}$ typical of acyl chlorides. Refractive index at 20° C., 1.5276.

Various changes and modifications may be made in the process described herein as will be apparent to those skilled in the chemical arts. It is accordingly intended that the present invention shall only be limited by the scope of the appended claims.

We claim:

1. A process for producing a new class of sulfur containing compounds of the formula

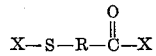

wherein X is selected from the group consisting of chlorine and bromine and R is selected from the group consisting of dimethylene, trimethylene, comprising reacting thiolactones selected from the group consisting of β- thiopropiolactone, γ-thiobutyrolactone, and a halogenating agent selected from the group consisting of chlorine, bromine, sulfuryl chloride.

2. Haloformylalkanesulfenyl halides corresponding to the formula

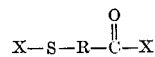

wherein X is selected from the group consisting of chlorine and bromine and R is selected from the group consisting of dimethylene, trimethylene.

3. The compound 3-chloroformylpropanesulfenyl chloride.

References Cited by the Examiner

UNITED STATES PATENTS 2,411,875  12/1946  Gresham et al. _____ 260—544
2,514,640   7/1950  Harman et al. _____ 260—544

LORRAINE A. WEINBERGER, *Primary Examiner.*

RICHARD K. JACKSON, *Examiner.*